(12) United States Patent
Nishi et al.

(10) Patent No.: US 12,386,065 B2
(45) Date of Patent: Aug. 12, 2025

(54) OBJECT DETECTION DEVICE

(71) Applicant: DENSO CORPORATION, Kariya (JP)

(72) Inventors: Takafumi Nishi, Nisshin (JP); Yu Koyama, Nisshin (JP); Tetsuya Aoyama, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/173,476

(22) Filed: Feb. 23, 2023

(65) Prior Publication Data
US 2023/0204765 A1  Jun. 29, 2023

Related U.S. Application Data

(63) Continuation of application No. PCT/JP2021/030604, filed on Aug. 20, 2021.

(30) Foreign Application Priority Data

Aug. 25, 2020 (JP) ................. 2020-141857

(51) Int. Cl.
*G01S 15/04* (2006.01)
*G01S 7/536* (2006.01)
(Continued)

(52) U.S. Cl.
CPC ............. *G01S 15/04* (2013.01); *G01S 7/536* (2013.01); *G01S 15/00* (2013.01); *G01S 15/931* (2013.01)

(58) Field of Classification Search
CPC .......... G01S 15/00; G01S 15/04; G01S 15/08; G01S 15/104; G01S 15/93; G01S 15/931; G01S 15/935; G01S 7/527; G01S 7/53
See application file for complete search history.

(56) References Cited

U.S. PATENT DOCUMENTS

| 5,523,058 A | * | 6/1996 | Umemura | ................. | A61N 7/02 |
| | | | | | 366/127 |
| 2005/0135190 A1 | * | 6/2005 | Katou | ................... | G01S 7/5273 |
| | | | | | 367/99 |

(Continued)

FOREIGN PATENT DOCUMENTS

| JP | H10-268035 A | 10/1998 |
| JP | 2014-232069 A | 12/2014 |

OTHER PUBLICATIONS

NPL Search (May 28, 2024).*

*Primary Examiner* — Van T Trieu
(74) *Attorney, Agent, or Firm* — Maschoff Brennan

(57) ABSTRACT

An object detection device includes: a transceiver having a predetermined resonance frequency; a driving signal generation unit generating a driving signal having a driving frequency different from the resonance frequency for driving the transceiver; a filter extracting and outputting at least one received signal from received signals of the transceiver; and a detection determination unit performing object detection determination based on the extracted at least one received signal. The received signals include a first and second received signals, the first received signal having a frequency that has been shifted from the driving frequency to the resonance frequency; and the filter has a characteristic that: when extracting the first received signal, outputs the extracted first received signal as a first output signal, and when extracting the second received signal, outputs the extracted second received signal as a second output signal, the first output signal being greater than the second output signal.

7 Claims, 4 Drawing Sheets

(51) Int. Cl.
    *G01S 15/00*     (2020.01)
    *G01S 15/931*     (2020.01)

(56) References Cited

U.S. PATENT DOCUMENTS

| | | | |
|---|---|---|---|
| 2006/0022680 A1* | 2/2006 | Suginouchi | G01F 1/66 324/635 |
| 2010/0242611 A1* | 9/2010 | Terazawa | G01S 15/931 73/629 |
| 2012/0224456 A1* | 9/2012 | Visser | G01S 7/521 367/118 |
| 2019/0025415 A1* | 1/2019 | Suchy | G01S 15/931 |

* cited by examiner

OBJECT DETECTION DEVICE

CROSS-REFERENCE TO RELATED APPLICATION

The present application is a continuation application of International Application No. PCT/JP2021/030604, filed on Aug. 20, 2021, which claims priority to Japanese Patent Application No. 2020-141857, filed on Aug. 25, 2020. The contents of these applications are incorporated herein by reference in their entirety.

BACKGROUND

Technical Field

The present disclosure relates to an object detection device.

Background Art

A technique is proposed that allows a vehicle, such as an automobile, to detect an obstacle with an ultrasonic sensor and automatically stop using the detection results. Although such an on-vehicle ultrasonic sensor uses a microphone as a transducer that transmits and receives ultrasonic waves, reverberation occurs after the microphone transmits a probe wave. When the probe wave is reflected from an object near the vehicle, the reflected wave is buried in the reverberation. Thus, a near object is more difficult to detect than a distant object.

SUMMARY

In the present disclosure, provided is an object detection device as the following.

The object detection device includes: a transceiver that has a predetermined resonance frequency; a driving signal generation unit configured to generate a driving signal having a driving frequency that is different from the resonance frequency for driving the transceiver; a filter configured to extract, from received signals of the transceiver, at least one received signal and output the extracted at least one received signal; and a detection determination unit configured to perform an object detection determination based on the extracted at least one received signal outputted from the filter. The received signals include a first received signal and a second received signal, the first received signal having a frequency that has been shifted from the driving frequency to the resonance frequency; and the filter has a characteristic that: when extracting the first received signal as the at least one received signal, outputs the extracted first received signal as a first output signal, and when extracting the second received signal as the at least one received signal, outputs the extracted second received signal as a second output signal, the first output signal being greater than the second output signal.

DETAILED DESCRIPTION OF THE PREFERRED EMBODIMENTS

Figure 1:
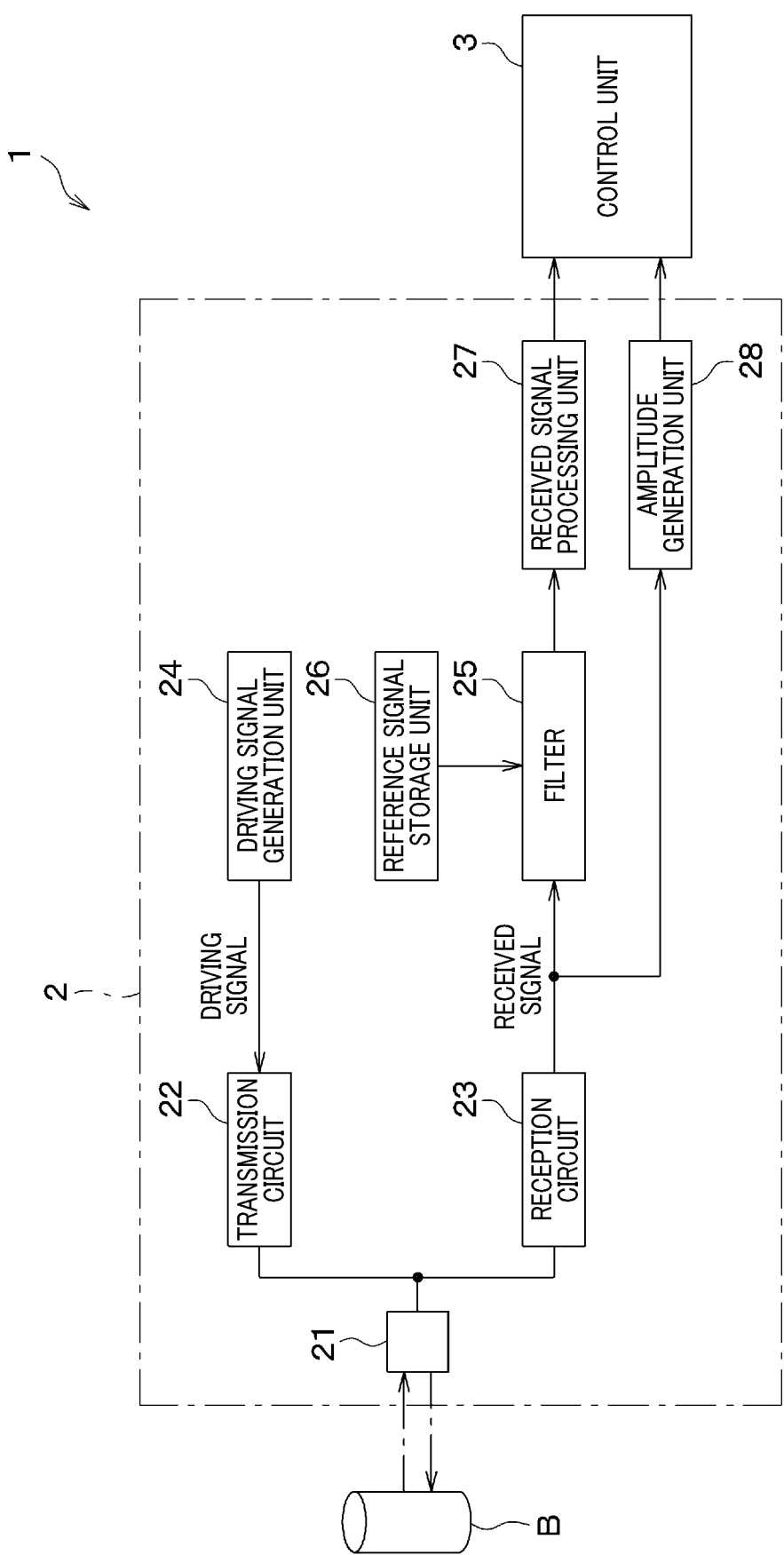
FIG. 1 is a block diagram illustrating the configuration of an object detection device according to a first embodiment.

PTL 1 describes, as an attempt to address this issue, a technique that drives a transducer at a frequency different from the resonance frequency and detects the beat component of the reverberation and the reflected wave to detect a near object.

[PTL 1] JP 10-268035 A

However, since reverberation has a considerably higher intensity than a reflected wave, it is challenging to detect a signal in reverberation as a beat in terms of S/N ratio. Furthermore, the microphone used for an on-vehicle sensor has a narrow band, and thus it is more challenging to detect a near object by detecting beats.

An object of the present disclosure is to enable an object detection device to easily detect a near object.

An object detection device according to an aspect of the present disclosure includes: a transceiver that has a predetermined resonance frequency and is configured to transmit an ultrasonic wave, and receive incoming ultrasonic waves as received signals; a driving signal generation unit configured to generate a driving signal for driving the transceiver, the driving signal having a driving frequency that is different from the resonance frequency; a filter configured to extract, from the received signals, at least one received signal and output the extracted at least one received signal; and a detection determination unit configured to perform an object detection determination based on the extracted at least one received signal outputted from the filter. The received signals include a first received signal and a second received signal, the first received signal having a frequency that has been shifted from the driving frequency to the resonance frequency; and the filter has a characteristic that: when extracting the first received signal as the at least one received signal, outputs the extracted first received signal as a first output signal, and when extracting the second received signal as the at least one received signal, outputs the extracted second received signal as a second output signal, the first output signal being greater than the second output signal.

When a microphone is driven at a frequency different from the resonance frequency, the structure of the microphone shifts the reverberation to the resonance frequency. Such drive characteristics may be utilized to extract, from the received signals, the first received signal having a frequency that has been shifted from the driving frequency to the resonance frequency, enabling the reflected wave from a near target buried in the reverberation to be detected with a high S/N ratio. This makes it easier to detect a near object.

Reference numerals within parentheses assigned to components indicate examples of correspondence between the components and specific components described in embodiments described later.

Embodiments of the present disclosure will now be described with reference to the drawings. In the following

First Embodiment

A first embodiment will now be described. An object detection device 1 according to the present embodiment illustrated in FIG. 1 is installed on a vehicle (not shown) and configured to detect an object B near the vehicle. The vehicle equipped with the object detection device 1 is hereinafter referred to as an own vehicle. The vehicle (not shown) is, for example, an automobile.

The object detection device 1 includes an ultrasonic sensor 2 and a control unit 3 that controls the operation of the ultrasonic sensor 2. The ultrasonic sensor 2 is configured to detect the object B by transmitting a probe wave that is ultrasonic wave and receiving the reflected wave of the probe wave from the object B.

The ultrasonic sensor 2 includes a transducer 21 as a transceiver, a transmission circuit 22, a reception circuit 23, a driving signal generation unit 24, a filter 25, a reference signal storage unit 26, a received signal processing unit 27, and an amplitude generation unit 28.

The transducer 21 has the function of a transmitter that transmits a probe wave externally and the function of a receiver that receives a reflected wave, and is electrically connected to the transmission circuit 22 and the reception circuit 23. In other words, the ultrasonic sensor 2 has a so-called integrated transmission/reception type configuration.

Specifically, the transducer 21 is configured as an ultrasound microphone incorporating an electromechanical energy conversion element such as a piezoelectric element. The transducer 21 is placed at a position facing the outer surface of the own vehicle so as to be capable of transmitting a probe wave to outside the own vehicle and receiving a reflected wave from outside the own vehicle.

The transmission circuit 22 is provided to drive the transducer 21 based on a received driving signal, causing the transducer 21 to send a probe wave. Specifically, the transmission circuit 22 includes a digital-to-analog converter circuit. More specifically, the transmission circuit 22 is configured to generate an element input signal by applying signal processing such as digital-to-analog conversion to a driving signal output from the driving signal generation unit 24. The element input signal is an alternating voltage signal for driving the transducer 21. The transmission circuit 22 is configured to cause a probe wave to be produced by applying the generated element input signal to the transducer 21 to energize the electromechanical energy conversion element in the transducer 21.

The reception circuit 23 is provided to generate a received signal corresponding to the ultrasonic wave reception result from the transducer 21 and output the generated signal to, for example, the filter 25. Specifically, the reception circuit 23 includes an amplifier circuit and an analog-to-digital converter circuit. More specifically, the reception circuit 23 is configured to generate a received signal containing information about the amplitude and frequency of a received wave by applying signal processing such as amplification and analog-to-digital conversion to an element output signal output from the transducer 21. The element output signal is an alternating voltage signal produced by the electromechanical energy conversion element in the transducer 21 in response to the reception of ultrasonic wave.

The driving signal generation unit 24 is provided to generate and output a driving signal to the transmission circuit 22. The driving signal is a signal for driving the transducer 21 to send a probe wave from the transducer 21.

With the transducer 21 having a resonance frequency f0, the driving signal generation unit 24 generates, for example, several periods of a driving signal have a frequency that is different from the resonance frequency f0. The driving signal generation unit 24 generates a driving signal have a frequency within the band of the transducer 21 and higher than the resonance frequency f0. Alternatively, the driving signal generation unit 24 generates a driving signal have a frequency within the band of the transducer 21 and lower than the resonance frequency f0.

The microphone used for an on-vehicle sensor typically has narrowband frequency characteristics with a band of the resonance frequency f0±2.5%. With such a microphone used, the driving signal generation unit 24 generates a driving signal having a frequency included in the range of the resonance frequency f0±2.5% and different from the center frequency of the band of the transducer 21. With the transducer 21 having a driving frequency fd, the sound pressure level of the probe wave can be ensured by generating a driving signal so that the driving frequency fd is included in the band of the transducer 21.

Figure 2:
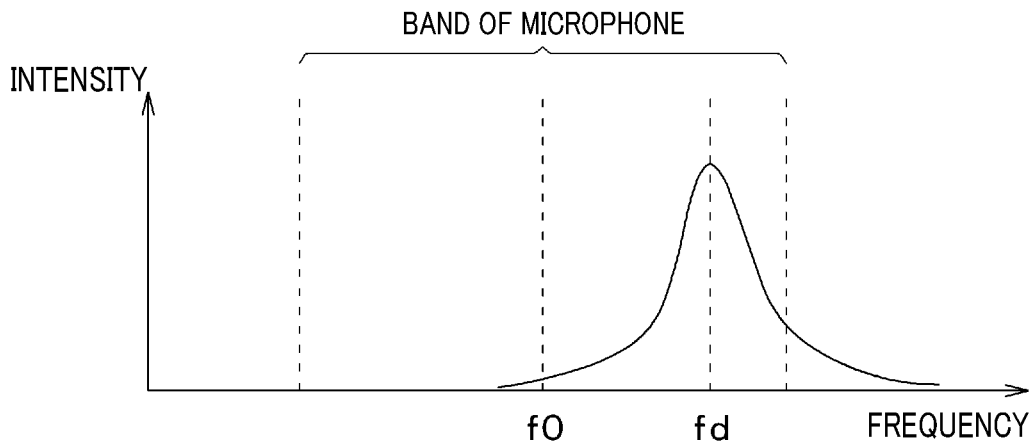
FIG. 2 illustrates a frequency component of a transmitted wave.
Figure 3:
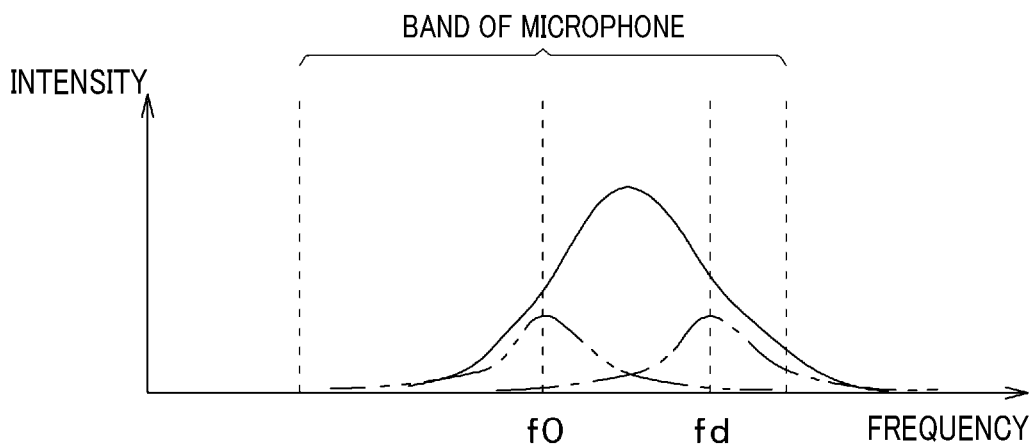
FIG. 3 illustrates a frequency component of a transmitted wave.
Figure 4:
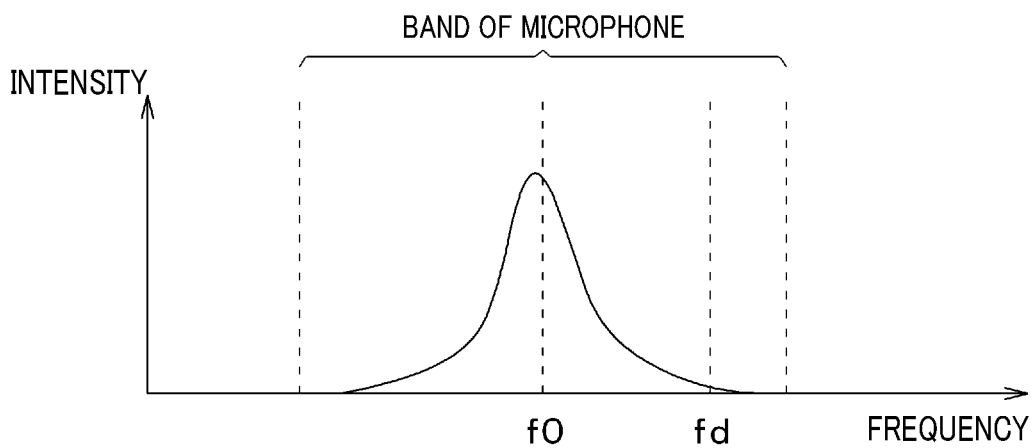
FIG. 4 illustrates a frequency component of a transmitted wave.

When a driving signal having a frequency that is higher than the resonance frequency f0 is generated, the frequency of the probe wave changes as shown in FIGS. 2 to 4. That is, during the drive by the driving signal, as shown in FIG. 2, the probe wave is transmitted at the driving frequency fd corresponding to the driving signal. After the end of the drive by the driving signal, as shown in FIG. 3, the frequency component corresponding to the driving signal decreases, while the component of the resonance frequency f0 due to reverberation increases, and the overall probe wave is transmitted at a frequency lower than the initial frequency, which is the driving frequency fd. In FIG. 3, a solid line indicates the frequency component of the overall probe wave, a dash-dot line indicates the frequency component of the driving signal, and a chain double-dashed line indicates the frequency component of the reverberation. Then, the reverberation component increases further, and the probe wave is transmitted at the resonance frequency f0 as shown in FIG. 4. In this manner, the frequency of the probe wave shifts from the frequency higher than the resonance frequency f0 to the resonance frequency f0.

Similarly, when a driving signal having a frequency that is lower than the resonance frequency f0 of the transducer 21 is generated, the frequency of the probe wave shifts from the frequency lower than the resonance frequency f0 to the resonance frequency f0.

The filter 25 is configured to extract, from the received signals, at least one received signal and output the extracted at least one received signal. As described above, the driving signal generation unit 24 generates a driving signal having a driving frequency that is different from the resonance frequency f0 of the transducer 21. The received signals include a first received signal and a second received signal, the first received signal having a frequency that has been shifted from the driving frequency to the resonance frequency f0. The filter 25 has the characteristic that when extracting the first received signal as the at least one received signal, outputs the extracted first received signal as a first output signal, and when extracting the second received signal as the at least one received signal, outputs the extracted second received signal as a second output signal, the first output signal being greater than the second output signal.

For example, as shown in FIG. 1, the ultrasonic sensor 2 includes the reference signal storage unit 26 that stores a reference signal to be compared with the received signal, and the filter 25 outputs the degree of correlation between the received signal and the reference signal stored in the reference signal storage unit 26. In this manner, the filter 25 that is an autocorrelation filter using the reference signal can improve the S/N ratio through pulse compression. The reference signal is, for example, designed from the driving frequency fd and the resonance frequency f0. In order to maximize the performance in consideration of the difference in characteristics between individual transducers 21, the characteristics of each individual transducer may be measured, stored, and then used as the reference signal.

The received signal processing unit 27 is configured to apply processing such as FFT to the output signal from the filter 25 to generate an amplitude signal corresponding to the amplitude of the received wave and a reception frequency signal corresponding to the frequency of the received wave. FFT is an abbreviation for Fast Fourier Transform. In addition, the received signal processing unit 27 is provided to output the generated amplitude signal and reception frequency signal to the control unit 3.

The amplitude generation unit 28 is provided to generate an amplitude signal from the received signal generated by the reception circuit 23 and output the generated amplitude signal to the control unit 3.

The control unit 3 is connected to the ultrasonic sensor 2 via a vehicle communication line to allow communication of information and configured to control the transmission/reception operation of the ultrasonic sensor 2.

The control unit 3 is provided as a sonar ECU and includes an on-vehicle microcomputer containing a CPU, ROM, RAM, and nonvolatile rewritable memory (not shown). ECU is an abbreviation for electronic control unit. The nonvolatile rewritable memory is, for example, EEPROM or flash ROM or the like. EEPROM is an abbreviation for electronically erasable programmable read-only memory. The ROM and the RAM and the like are non-transitory tangible storage medium.

The control unit 3 is configured to perform object detection determination based on the output signal from the filter 25 processed by the received signal processing unit 27, and corresponds to a detection determination unit. In the present embodiment, the control unit 3 performs object detection determination when both the amplitude signal generated by the received signal processing unit 27 from the signal output from the filter 25 and the amplitude signal generated by the amplitude generation unit 28 from the signal output from the reception circuit 23 are greater than a predetermined threshold value. The received wave includes reflected waves from a target to be detected as well as noise and reflected waves from the road surface. However, erroneous determination caused by, for example, noise can be reduced by detecting an object on condition that the amplitude of the signal output from the filter 25 and also the amplitude of the received signal are great.

Figure 5:
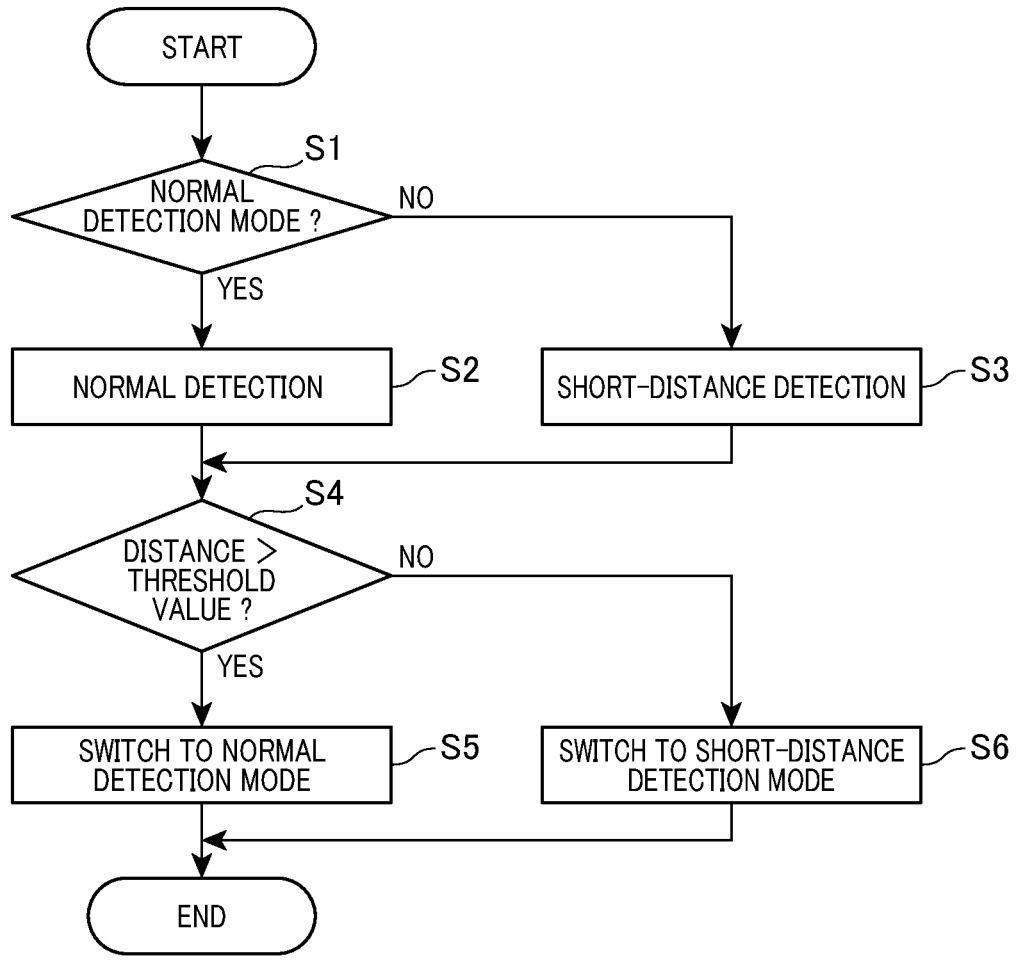
FIG. 5 is a flowchart of an object detection process.

The operation of the object detection device 1 will now be described. When the ignition of the own vehicle is turned on, the object detection device 1 repeats an object detection process illustrated in FIG. 5.

When the driving frequency fd is shifted from the resonance frequency f0 of the transducer 21 or the pulse length of the driving signal is reduced to shorten the reverberation time, the transducer 21 provides lower output. Thus, in the present embodiment, the object detection device 1 switches between a short-distance detection mode for detecting an object within a predetermined distance from the own vehicle and a normal detection mode for detecting an object at a distance greater than the predetermined distance.

Specifically, the object detection device 1 is normally in the normal detection mode and drives the transducer 21 at the resonance frequency f0. When the distance to an object detected in the normal detection mode is less than or equal to a predetermined threshold value, the object detection device 1 switches to the short-distance detection mode and drives the transducer 21 at a frequency different from the resonance frequency f0. In contrast, when the distance to an object detected in the short-distance detection mode becomes greater than the predetermined threshold value the object detection device 1 switches to the normal detection mode.

First, in step S1, the object detection device 1 determines whether the device is in the normal detection mode. If determining that the device is in the normal detection mode, in step S2, the object detection device 1 drives the transducer 21 at the resonance frequency f0 to perform normal detection. In contrast, if determining that the device is not in the normal detection mode but is in the short-distance detection mode, in step S3, the object detection device 1 drives the transducer 21 at a frequency different from the resonance frequency f0 to perform short-distance detection.

The process proceeds from step S2 or step S3 to step S4. In step S4, when an object is detected, the object detection device 1 calculates the distance to the object based on, for example, the time taken from the transmission of the probe wave to the reception of the reflected wave, and determines whether the distance to the object is greater than the predetermined threshold value. If determining that the distance to the object is greater than the threshold value, in step S5, the object detection device 1 switches to the normal detection mode and ends the process. In contrast, if determining that the distance to the object is less than or equal to the threshold value, in step S6, the object detection device 1 switches to the short-distance detection mode and ends the process.

In this manner, when the detected distance exceeds the threshold value in the short-distance detection mode, the object detection device 1 switches to the normal detection mode, and the transducer 21 is driven at the resonance frequency f. Thus, a target can be detected in a wide range of distance from far to near.

While the vehicle is traveling, an obstacle approaches the own vehicle usually from a long distance and can thus be detected typically in the normal detection mode. In contrast, immediately after start-up of the object detection device 1, or in other words, immediately after the ignition of the vehicle is turned on, an obstacle may be already near the own vehicle. For example, while the own vehicle is parked, another vehicle may be parked adjacent to the own vehicle, and in this state, the ignition of the own vehicle may be turned on.

To detect an obstacle irrespective of whether the obstacle is near or far immediately after start-up, the object detection device 1 alternates between the normal detection mode and the short-distance detection mode until the elapse of a predetermined time period from start-up. When detecting an object during this time period, the object detection device 1 switches to the normal detection mode or the short-distance detection mode in accordance with the detected distance. The detection efficiency can be improved by changing the way of switching between the normal detection mode and the short-distance detection mode depending on whether the current state is immediately after start-up or after the elapse of the predetermined time period.

Figure 6:
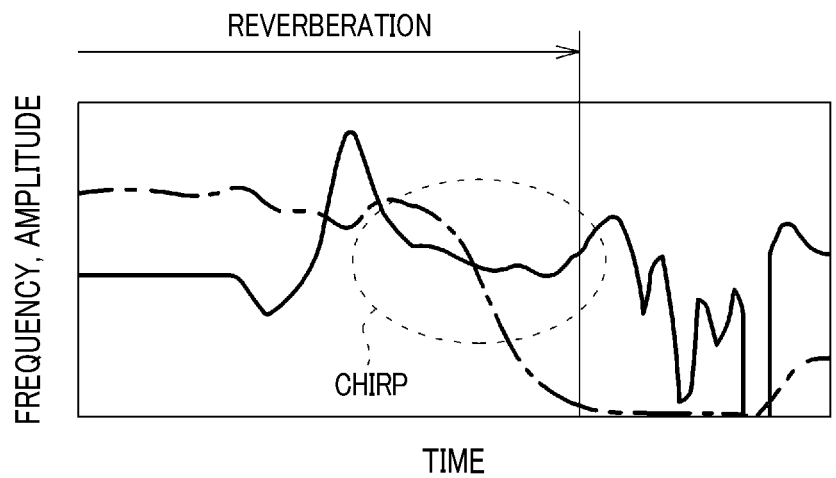
FIG. 6 illustrates the frequency and amplitude of a received signal.
Figure 7:
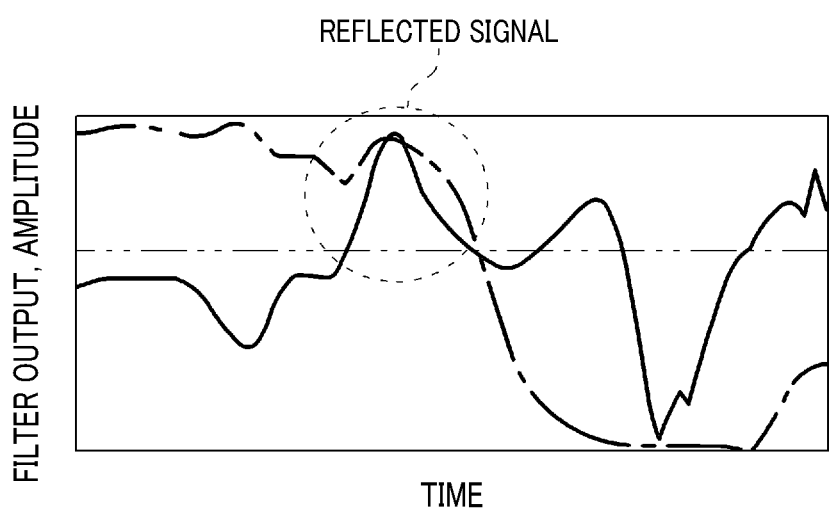
FIG. 7 illustrates filter output and the amplitude of the received signal.

FIGS. 6 and 7 illustrate the results of an experiment conducted by the present inventors. In the experiment, with a pole having a diameter of 60 mm placed as a target at a distance of 15 cm from the transducer 21, the transducer 21 was driven at a frequency higher than the resonance frequency f0 to transmit and receive a probe wave. In FIG. 6, a solid line indicates the frequency of a received signal, and a dash-dot line indicates the amplitude of the received signal. In FIG. 7, a solid line indicates output values from the filter 25, a dash-dot line indicates the amplitude of the received signal, and a chain double-dashed line indicates a threshold value used for detecting a reflected signal.

In FIG. 6, it can be confirmed that the frequency is chirped while the received signal has reverberation. This is because after driving by a driving signal, the reverberation of the transducer 21 shifted from the driving frequency fd to the resonance frequency f0, and the transmitted wave was reflected from a target and received by the transducer 21. When the received signal was processed through the filter 25, as shown in FIG. 7, a reflected signal buried in the reverberation was detected.

As described above, in the present embodiment, when the transducer 21 is driven at the driving frequency fd different from the resonance frequency f0, and the reverberation after driving is shifted from the driving frequency fd to the resonance frequency f0, a chirp in frequency is generated. The signal shifted in frequency may be extracted through the filter 25 to detect the reflected wave from a near target buried in the reverberation with a high S/N ratio. This method makes it easier to detect a near object.

To accurately detect the beat component using the method described in Patent Literature 1, the transceiver needs to be continuously driven at a frequency significantly different from the reverberation frequency for the period of time during which the signal is shifted by several waves, and such driving cannot be easily achieved with an on-vehicle sensor including a microphone with a narrow band.

In contrast, in the present embodiment, the driving frequency fd may not be significantly different from the resonance frequency f0, and driving may be performed within the band of the transducer 21 and thus achieved with an on-vehicle sensor including a microphone with a narrow band.

Other Embodiments

The present disclosure is not limited to the above-described embodiment, but may be modified as appropriate. It should be understood, of course, that components constituting the above embodiment may not be necessary unless otherwise specified or unless such components seem to be obviously necessary in principle.

For example, the object detection device 1 may not include the reference signal storage unit 26, and the characteristics of the filter 25 may be determined as described above in another way. The object detection device 1 may not include the amplitude generation unit 28, and the control unit 3 may perform object detection determination based merely on the output from the received signal processing unit 27.

The functional components and the method described above may be implemented by a dedicated computer including memory and a processor programmed to execute one or more functions embodied by computer programs. Alternatively, the functional components and the method described above may be implemented by a dedicated computer including a processor that has at least one dedicated hardware logic circuit. Alternatively, the functional components and the method described above may be implemented by at least one dedicated computer including a combination of memory and a processor programmed to execute one or more functions and a processor that has at least one hardware logic circuit. The computer programs may be stored in a non-transitory tangible storage medium as instructions executable by a computer.

What is claimed is:

1. An object detection device comprising:
    a transceiver that has a predetermined resonance frequency and is configured to transmit an ultrasonic wave, and receive incoming ultrasonic waves as received signals;
    a driving signal generation unit configured to generate a driving signal for driving the transceiver, the driving signal having a driving frequency that is different from the resonance frequency;
    a filter configured to extract, from the received signals, at least one received signal and output the extracted at least one received signal;
    a detection determination unit configured to perform an object detection determination based on the extracted at least one received signal outputted from the filter; and
    a storage unit configured to store a reference signal, wherein:
        the received signals include a first received signal and a second received signal, the first received signal having a frequency that has been shifted from the driving frequency to the resonance frequency; and
        the filter is configured to output a degree of correlation between the received signals and the reference signal stored in the storage unit in which the filter has a characteristic that:
            when extracting the first received signal as the at least one received signal, outputs the extracted first received signal as a first output signal having a predetermined first intensity, and
            when extracting the second received signal as the at least one received signal, outputs the extracted second received signal as a second output signal having a predetermined second intensity; and
        the first intensity of the first output signal is greater than the second intensity of the second output signal.

2. The object detection device according to claim 1, wherein
    the detection determination unit is configured to perform the object detection determination when both an amplitude of the at least one received signal output from the filter and an amplitude of each of the received signals are greater than a predetermined value.

3. The object detection device according to claim 1, wherein
    the transceiver has narrowband frequency characteristics.

4. The object detection device according to claim 1, wherein
    the driving signal generation unit is configured to generate the driving signal having a driving frequency within a band of the transceiver and different from a center frequency of the band of the transceiver.

5. The object detection device according to claim 1, wherein
    the object detection device switches between a short-distance detection mode for detecting an object within a predetermined range and a normal detection mode for detecting an object at a distance greater than the predetermined range, and the driving signal generation unit is configured to,
   in the short-distance detection mode, generate the driving signal having a driving frequency that is different from the resonance frequency, and
   in the normal detection mode, generate the driving signal having a driving frequency corresponding to the resonance frequency.

6. The object detection device according to claim 5, wherein
   in the normal detection mode, the object detection device switches to the short-distance detection mode when a distance to a detected object becomes less than or equal to a threshold value, and
   in the short-distance detection mode, the object detection device switches to the normal detection mode when a distance to a detected object becomes greater than the threshold value.

7. The object detection device according to claim 5, wherein
   the object detection device alternates between the normal detection mode and the short-distance detection mode until an elapse of a predetermined time period from start-up, and in response to detection of an object, the object detection device switches to the normal detection mode or the short-distance detection mode in accordance with a distance to the detected object.

* * * * *